(12) United States Patent
Huang et al.

(10) Patent No.: US 11,167,733 B2
(45) Date of Patent: Nov. 9, 2021

(54) DEVICE FOR INFLATING AUTOMOBILE TIRES

(71) Applicant: JINDAI AUTO SUPPLIES CO., LTD, Changhua County (TW)

(72) Inventors: Jui Meng Huang, Changhua County (TW); Yen Chun Huang, Changhua County (TW); Chang Yu Huang, Changhua County (TW)

(73) Assignee: JINDAI AUTO SUPPLIES CO., LTD, Changhua County (TW)

( * ) Notice: Subject to any disclaimer, the term of this patent is extended or adjusted under 35 U.S.C. 154(b) by 0 days.

(21) Appl. No.: 17/089,699

(22) Filed: Nov. 4, 2020

(65) Prior Publication Data

US 2021/0129605 A1    May 6, 2021

(30) Foreign Application Priority Data

Nov. 4, 2019   (TW) .................................. 108214557

(51) Int. Cl.
| | |
|---|---|
| *B60S 5/04* | (2006.01) |
| *B60C 29/04* | (2006.01) |
| *B60C 29/06* | (2006.01) |
| *B60C 25/18* | (2006.01) |

(52) U.S. Cl.
CPC .............. *B60S 5/043* (2013.01); *B60C 25/18* (2013.01); *B60C 29/04* (2013.01); *B60C 29/064* (2013.01); *B60C 29/06* (2013.01)

(58) Field of Classification Search
CPC . B60S 5/04; B60S 5/043; B60C 25/18; B60C 29/064; B60C 29/04; B60C 29/06
See application file for complete search history.

(56) References Cited

U.S. PATENT DOCUMENTS

| | | | | |
|---|---|---|---|---|
| 1,903,233 | A * | 3/1933 | Gille ....................... | B60S 5/046 137/224.5 |
| 1,985,759 | A * | 12/1934 | Baumgartner .......... | B60S 5/043 137/224 |
| 2,152,375 | A * | 3/1939 | Crowley ............... | B60C 29/064 285/317 |
| 3,996,957 | A * | 12/1976 | Goldish .................. | F16K 15/20 137/224 |
| 5,544,670 | A * | 8/1996 | Phillips ..................... | B60S 5/04 137/224 |
| 5,906,227 | A * | 5/1999 | Sowry ..................... | B60S 5/043 141/65 |

(Continued)

*Primary Examiner* — Nicolas A Arnett
(74) *Attorney, Agent, or Firm* — Chun-Ming Shih; Lanway IPR Services

(57) ABSTRACT

A device for inflating a tire includes a forward sleeve including an internally threaded head; an air intake assembly including a joining member secured to the forward sleeve and having a constricted section and an air inlet; an air intake extending out of the joining member at an acute angle and having an air channel for communicating with the air inlet through the constricted section, and a connector; and a rear sleeve secured to the joining member; and a valve assembly including a rod through both the rear sleeve and the joining member; a mounting sleeve in the forward sleeve and having a groove at a first end, the groove being in the internally threaded head, and a fitting hole communicating with the groove; a flexible tubular member in the mounting sleeve; a handle secured to the rod; and a snap ring on the rod.

1 Claim, 9 Drawing Sheets

(56) References Cited

U.S. PATENT DOCUMENTS

| | | | | |
|---|---|---|---|---|
| 6,557,404 B2* | 5/2003 | Ziarati | .................. | B60C 29/064 |
| | | | | 73/146 |
| 6,786,247 B1* | 9/2004 | Kemppainen | ......... | F04B 33/005 |
| | | | | 137/223 |
| 6,865,931 B1* | 3/2005 | Ziarati | .................. | B60C 29/064 |
| | | | | 73/146.8 |
| 7,073,545 B2* | 7/2006 | Smith | .................... | B60P 7/065 |
| | | | | 137/228 |
| 7,320,347 B2* | 1/2008 | Ramsey | ................. | B60P 7/065 |
| | | | | 137/228 |
| 7,913,724 B2* | 3/2011 | Pansegrouw | ........... | B63B 25/24 |
| | | | | 141/197 |
| 9,630,596 B2* | 4/2017 | Zalzalah | ................ | F16K 51/00 |
| 10,315,473 B2* | 6/2019 | Weflen | ................... | B60C 23/10 |
| 11,046,128 B2* | 6/2021 | Chou | ................... | B29C 73/166 |
| 2018/0339562 A1* | 11/2018 | Liu | ....................... | F16L 37/086 |
| 2021/0086460 A1* | 3/2021 | Chou | ................... | B29C 73/166 |

\* cited by examiner

DEVICE FOR INFLATING AUTOMOBILE TIRES

BACKGROUND OF THE INVENTION

1. Field of the Invention

The invention relates to devices for inflating automobile tires and more particularly to a device for inflating automobile tires having improved characteristics.

2. Description of Related Art

A conventional device for inflating larger tubeless tires includes a segmented manifold which is expandable radially to accommodate different sizes of tires. The manifold includes outlet holes from which pressurized gas may exit to inflate the tire. The holes have centerlines which make angles between 40-degree and 75-degree with a plane containing the manifold. The angled holes direct the pressurized air exiting the manifold in optimum directions to expand the tire sidewall against the wheel flange to assist in sealing the tire beads against the wheel.

While the device enjoys its success in the market, continuing improvements in the exploitation of device for inflating automobile tires of this type are constantly being sought.

SUMMARY OF THE INVENTION

It is therefore one object of the invention to provide a device for inflating a tire including a valve having external threads, and an injection nozzle including a projection and a needle projecting rearward from the projection, comprising a forward sleeve including an internally threaded head at a first end, the internally threaded head being configured to threadedly secure to the external threads; an air intake assembly including a joining member having a first end secured to a second end of the forward sleeve, the joining member having a constricted section and an air inlet at a second end; an air intake extending out of the joining member at an acute angle and having an air channel adjacent to the constricted section, the air channel being configured to be in fluid communication with the air inlet through the constricted section, and a connector; and a rear sleeve having a first end secured to a second end of the joining member; and a valve assembly including a rod through both the rear sleeve and the joining member; a mounting sleeve in a first end of the forward sleeve and having a groove at a first end, the groove being in the internally threaded head, and a fitting hole configured to be in fluid communication with the groove; a flexible tubular member disposed in the mounting sleeve and having a positioning section in the fitting hole; a handle secured to a second end of the rod; and a snap ring disposed on the rod; wherein the projection is fastened by the groove and the needle is inserted into the positioning section; wherein a push of the handle pushes the injection nozzle into the external threads; and wherein the snap ring is configured to limit a rearward movement of the valve assembly when the snap ring is stopped by the constricted section.

The above and other objects, features and advantages of the invention will become apparent from the following detailed description taken with the accompanying drawings.

DETAILED DESCRIPTION OF THE INVENTION

Figure 1:
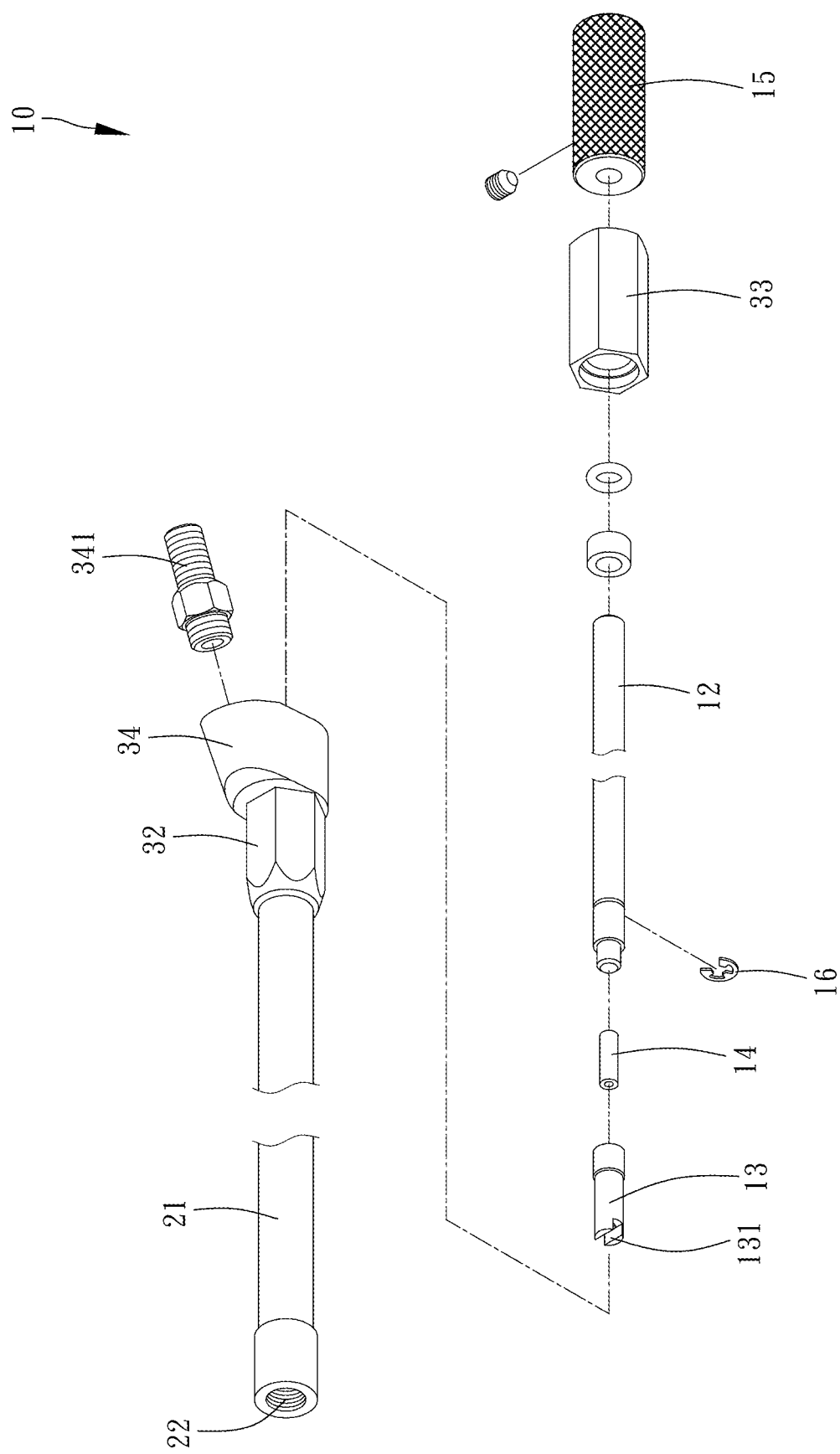
FIG. 1 is an exploded view of a device for inflating automobile tires according to a first preferred embodiment of the invention.
Figure 2:
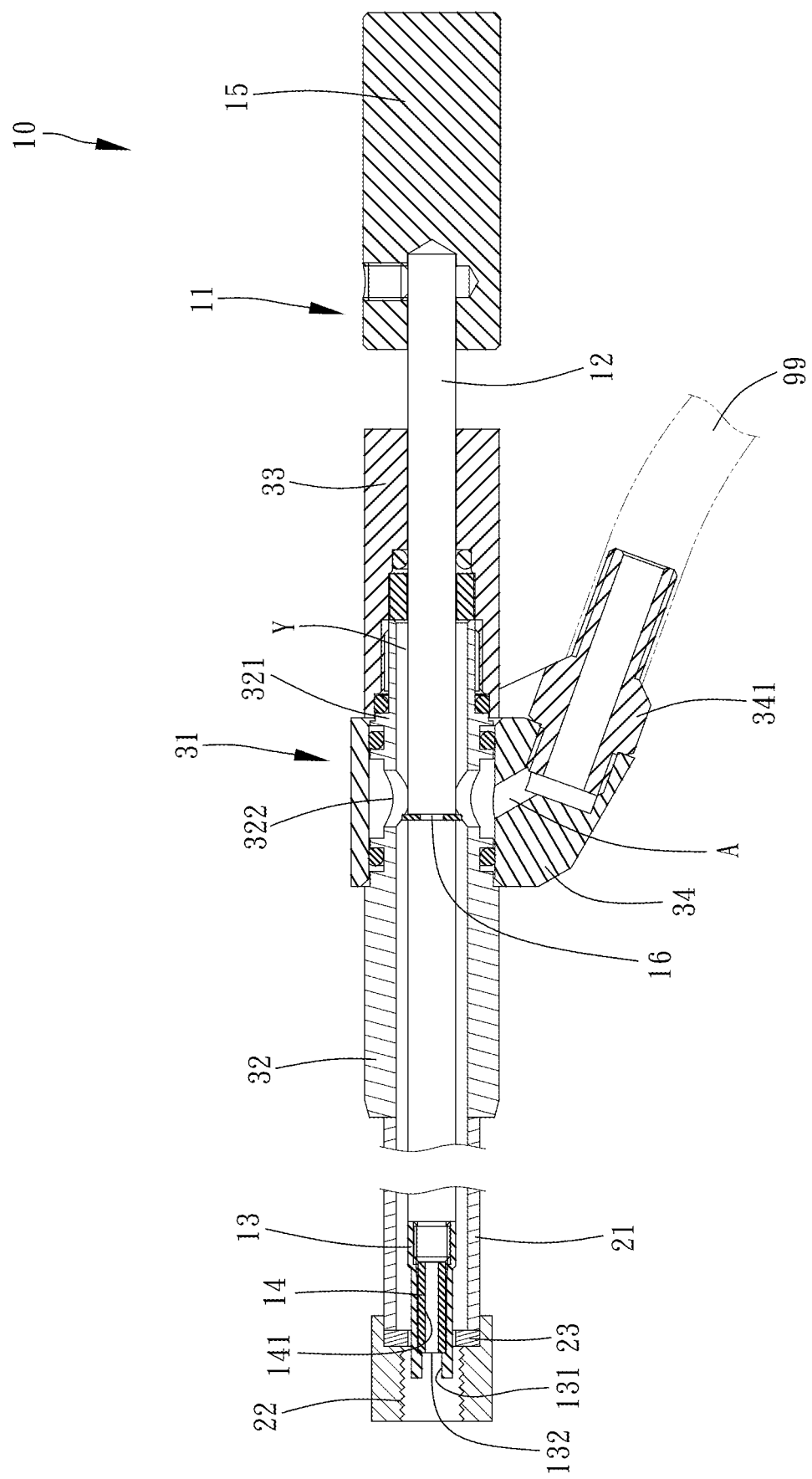
FIG. 2 is a longitudinal sectional view of the assembled device for inflating automobile tires of FIG. 1.

Referring to FIGS. 1 to 3B, a device 10 for inflating automobile tires in accordance with a first preferred embodiment the invention is shown. The device 10 cooperates with, as known in the art, a valve 91 of a tire, the valve 91 having external threads 911; and an injection nozzle 92 including a projection 921 at a rear end and a needle 922 projecting rearward from the projection 921.

The device 10 comprises a forward sleeve 21 including an internally threaded head 22 at a first end, the internally threaded head 22 being threadedly secured to the external threads 911; an air intake assembly 31 including a joining member 32 having a first end secured to a second end of the forward sleeve 21 and using an O-ring 23 to seal a joining portion of the joining member 32 and the internally threaded head 22, the joining member 32 having a constricted section 322 and an air inlet 321 at a second end; an air intake 34 extending out of the joining member 32 at an acute angle and having an air channel A adjacent to the constricted section 322 and communicating with the air inlet 321 through the constricted section 322, and a connector 341 at a distal end for releasably connecting to a pressurized air source 99; and a rear sleeve 33 having a first end secured to a second end of the joining member 32; and a valve assembly 11 including a rod 12 through both the rear sleeve 33 and the joining member 32; a mounting sleeve 13 in a first end of the forward sleeve 21 and having a groove 131 at a first end, the groove 131 being in the internally threaded head 22, and a fitting hole 132 communicating with the groove 131; a flexible tubular member 14 disposed in the mounting sleeve 13 and having a positioning section 141 in the fitting hole 132; a handle 15 secured to a second end of the rod 12; and a snap ring 16 snapped into an annular groove (not numbered) on the rod 12. The projection 921 is fastened by the groove 131. The needle 922 is inserted into the positioning section 141 to be positioned. An air path Y consists of the joining member 32, the rear sleeve 33 and the forward sleeve 21 and the air path Y communicates with the atmosphere through the air inlet 321 and the air channel A. The snap ring 16 may limit a rearward movement of the valve assembly 11 when the snap ring 16 is stopped by the constricted section 322.

Figure 3A:
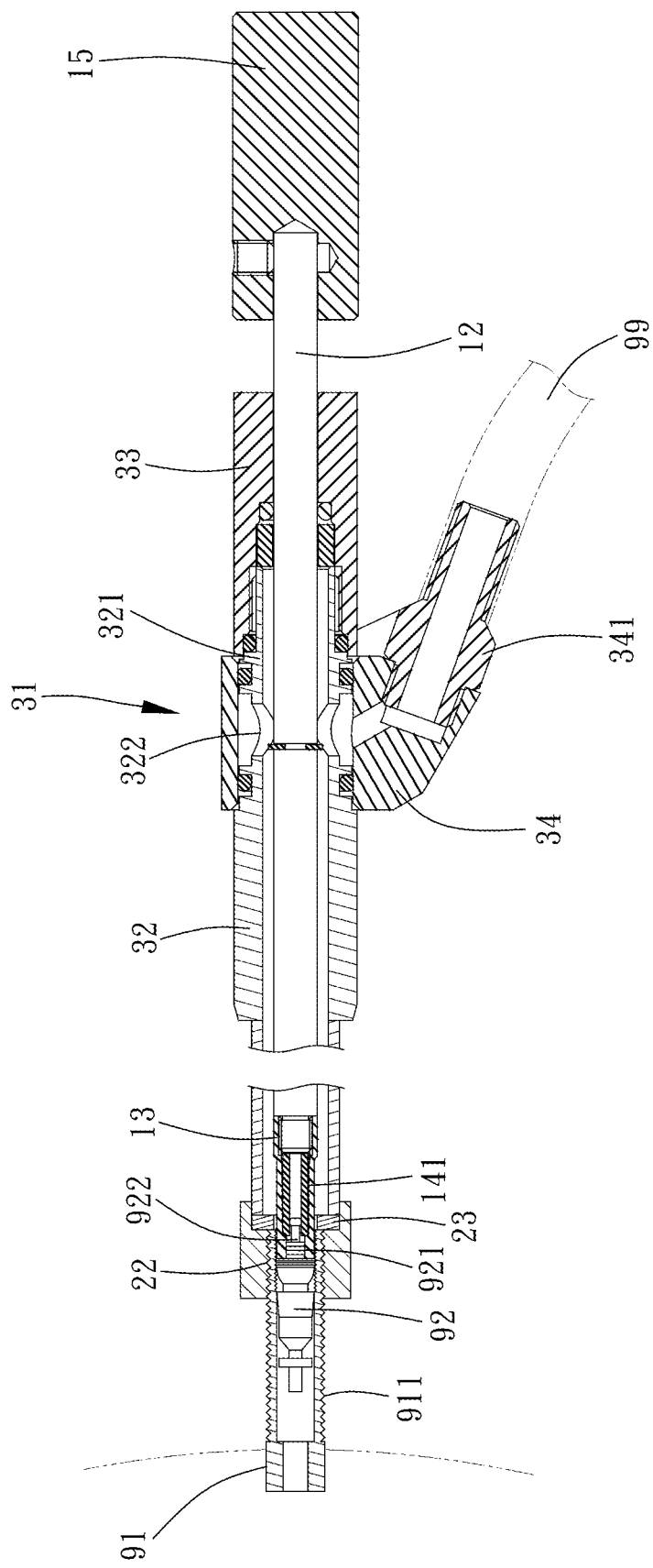
FIG. 3A is a view similar to FIG. 2 showing a tire inflation state.

As shown in FIG. 3A specifically, a push of the handle 15 can push the injection nozzle 92 into the external threads 911. Thereafter, tire inflation is made possible.

Figure 3B:
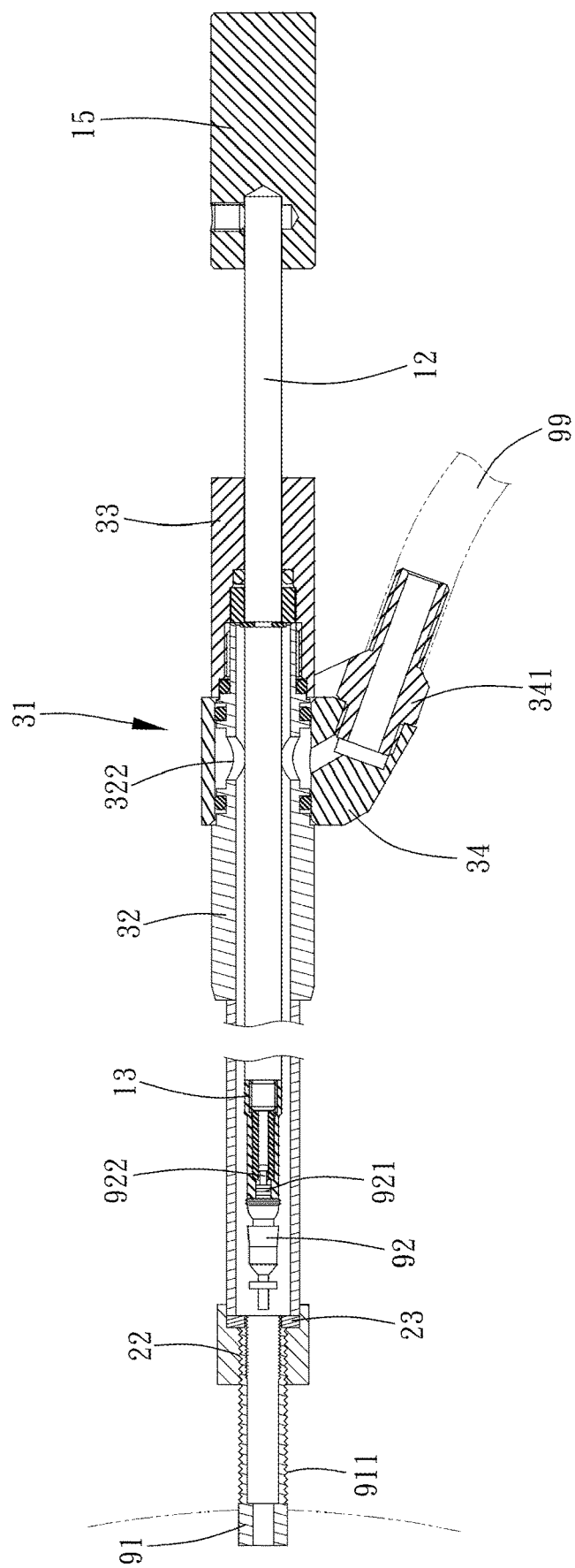
FIG. 3B is a view similar to FIG. 3A showing a state after inflating the tire.
Figure 4:
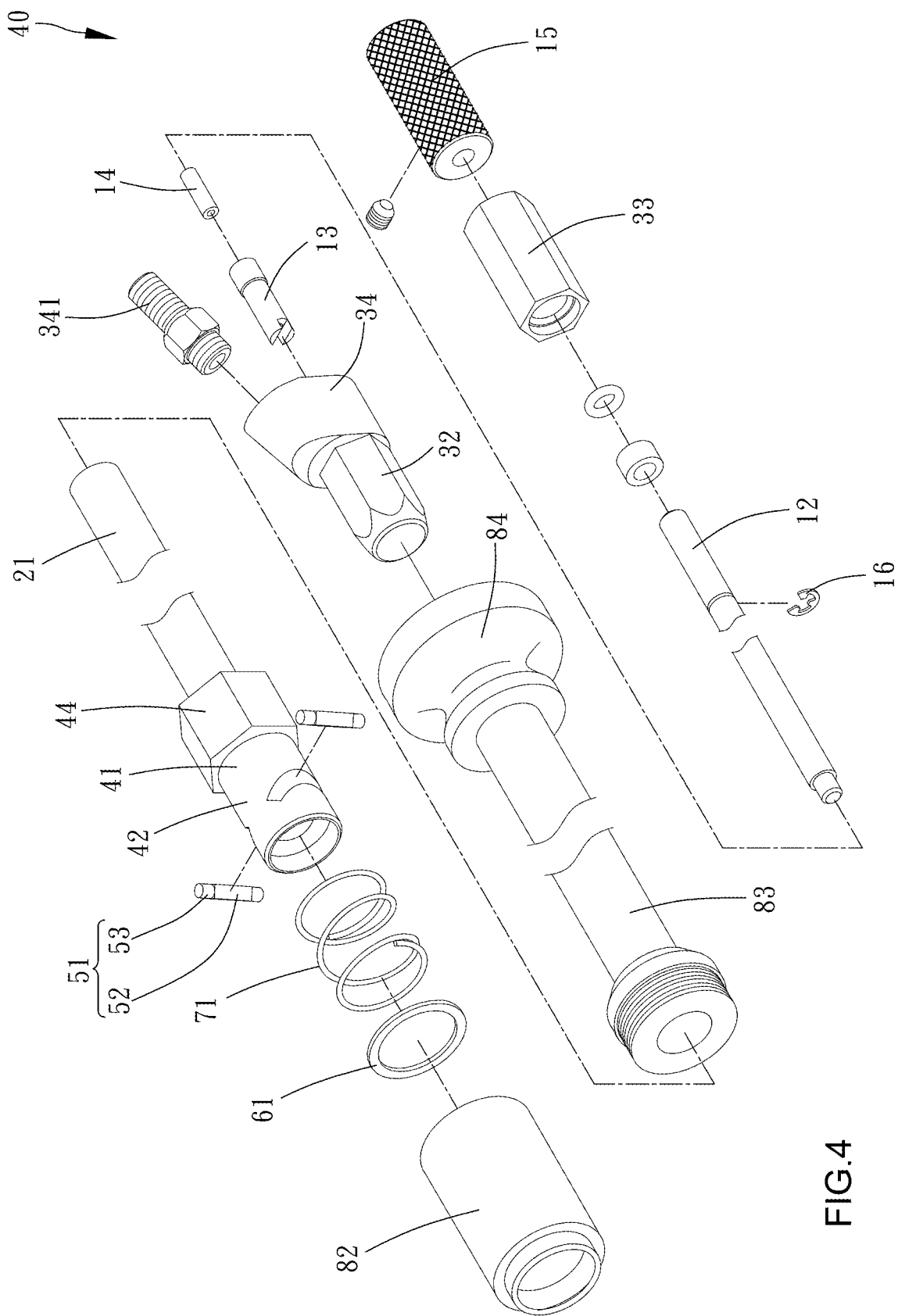
FIG. 4 is s an exploded view of a device for inflating automobile tires according to a second preferred embodiment of the invention.
Figure 5:
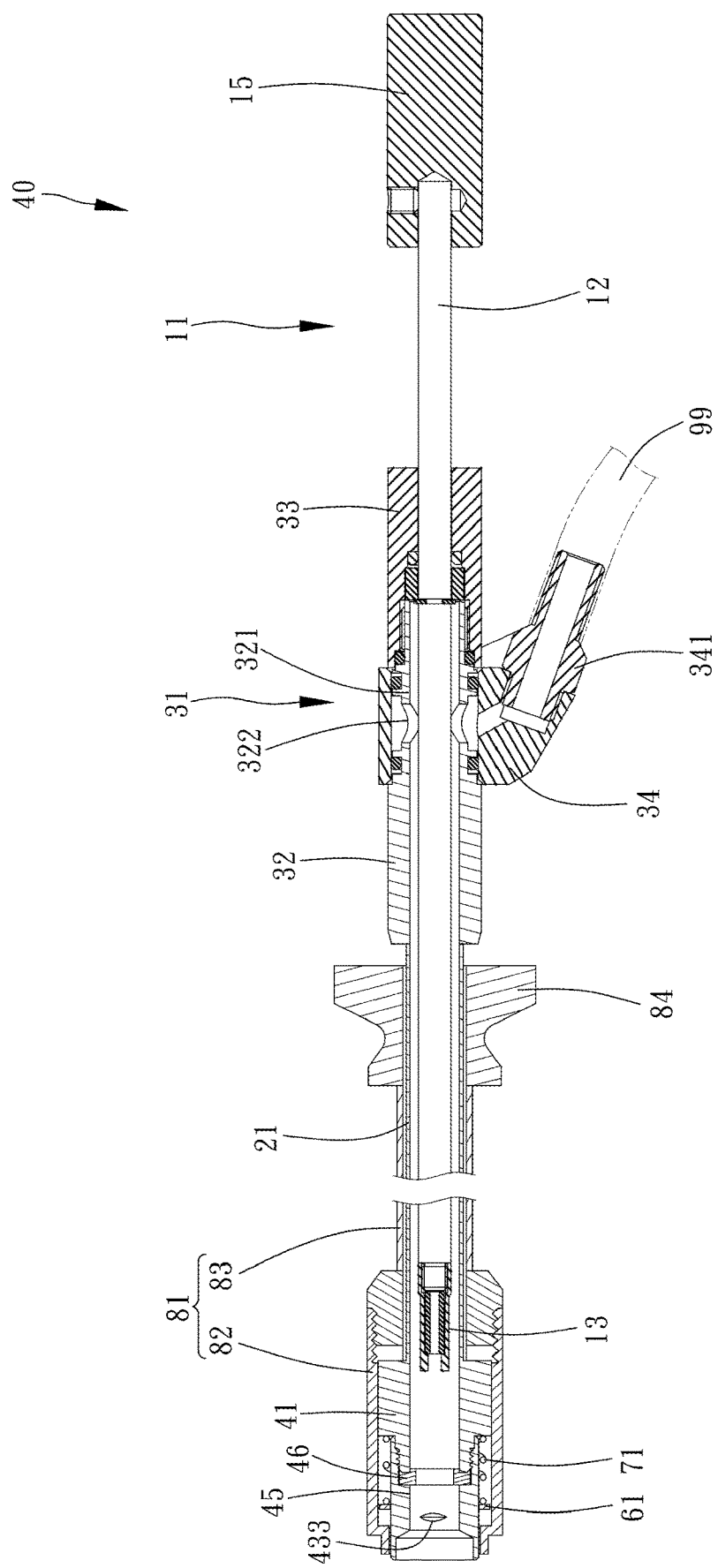
FIG. 5 is a longitudinal sectional view of the assembled device for inflating automobile tires of FIG. 4.
Figure 6:
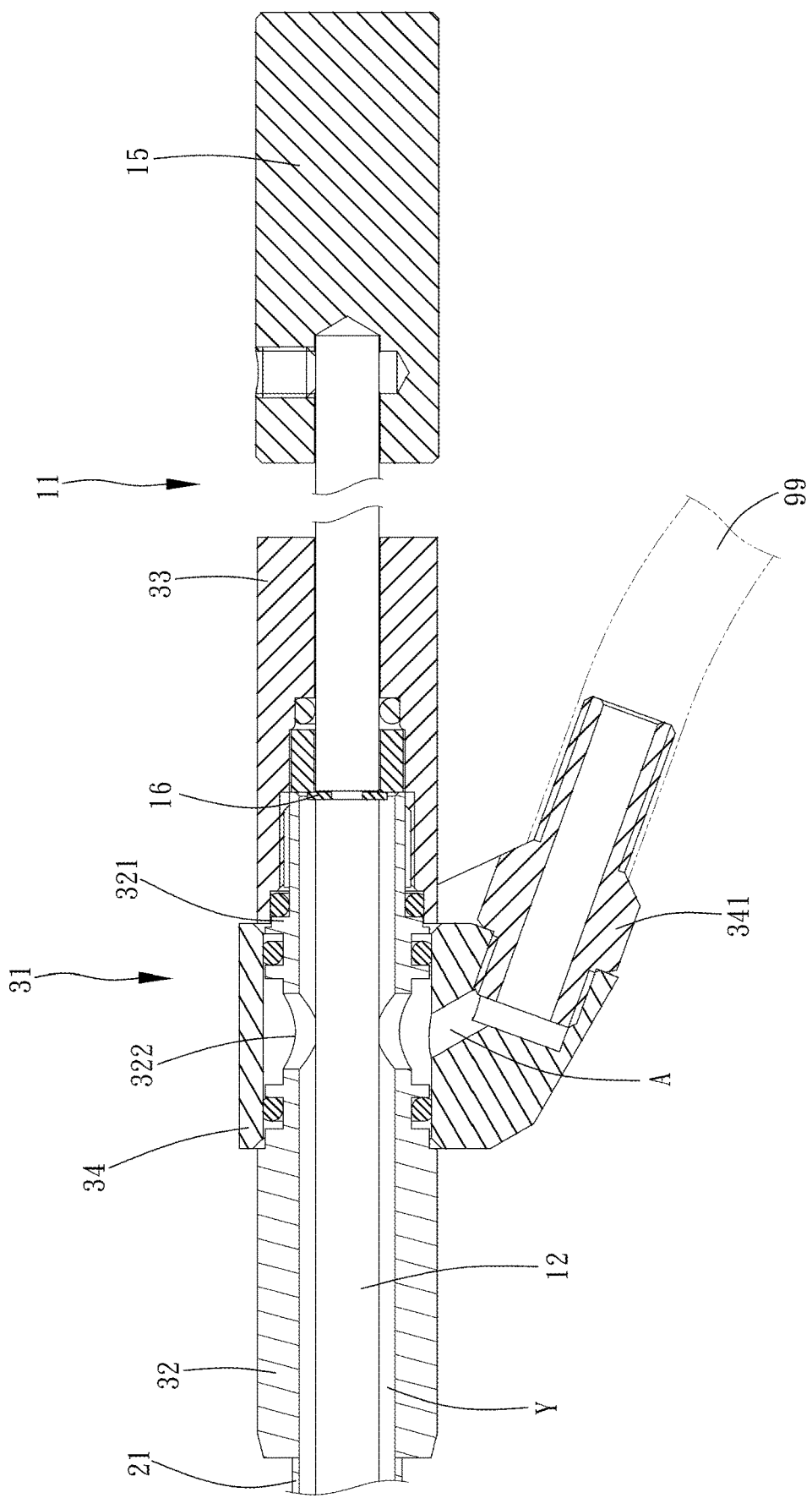
FIG. 6 is a view similar to the right part of FIG. 5 showing components of the right part.
Figure 7:
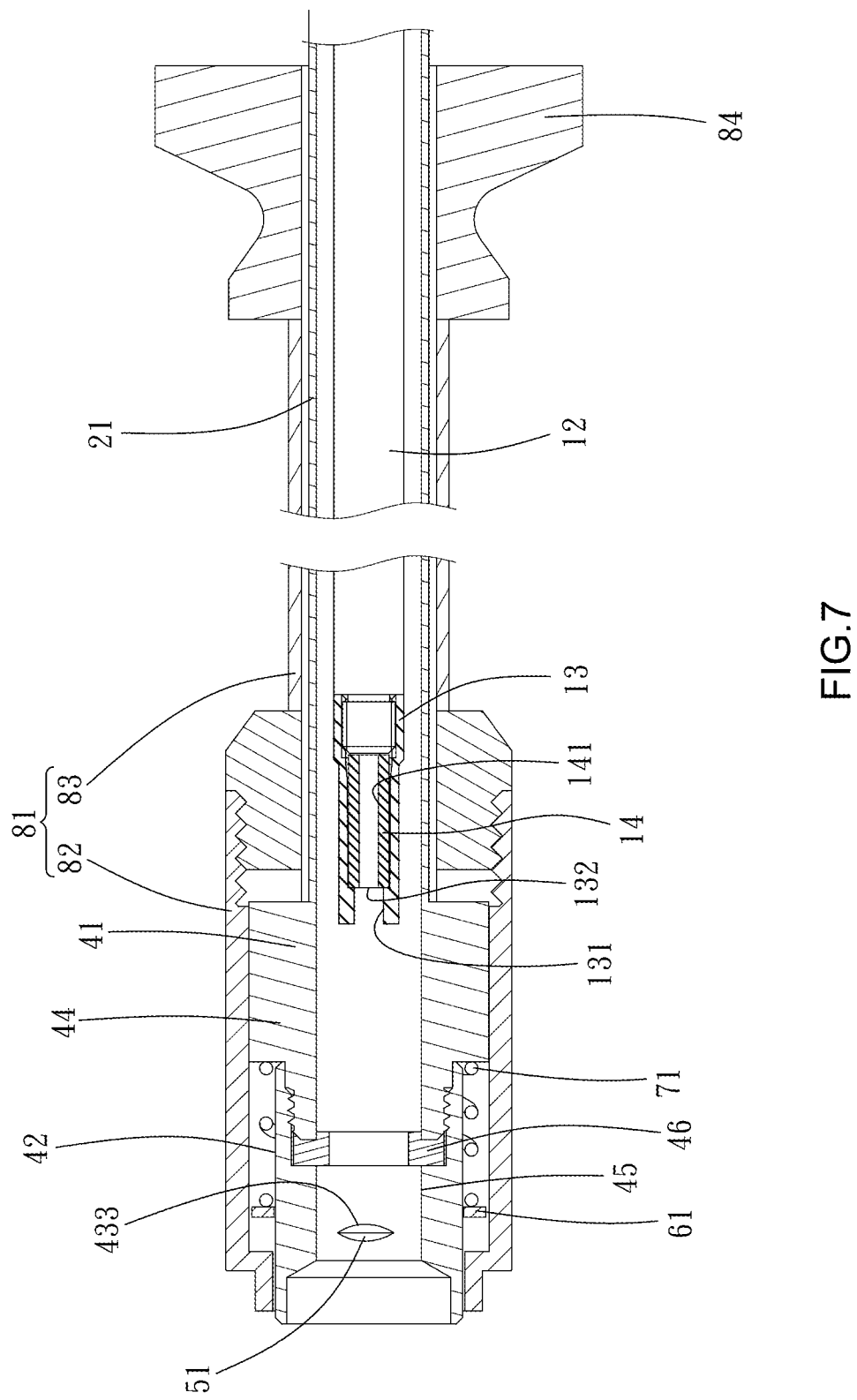
FIG. 7 is a view similar to the left part of FIG. 5 showing components of the left part.
Figure 9:
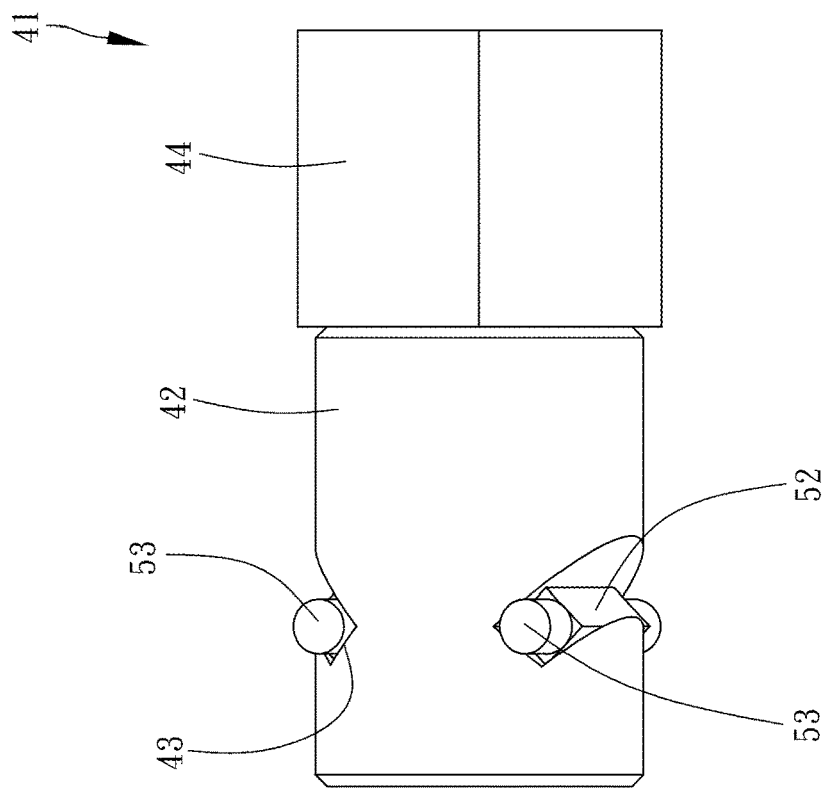
FIG. 9 is a view similar to FIG. 8 showing the nozzle connection assembly and the catches in the grooves.
Figure 8:
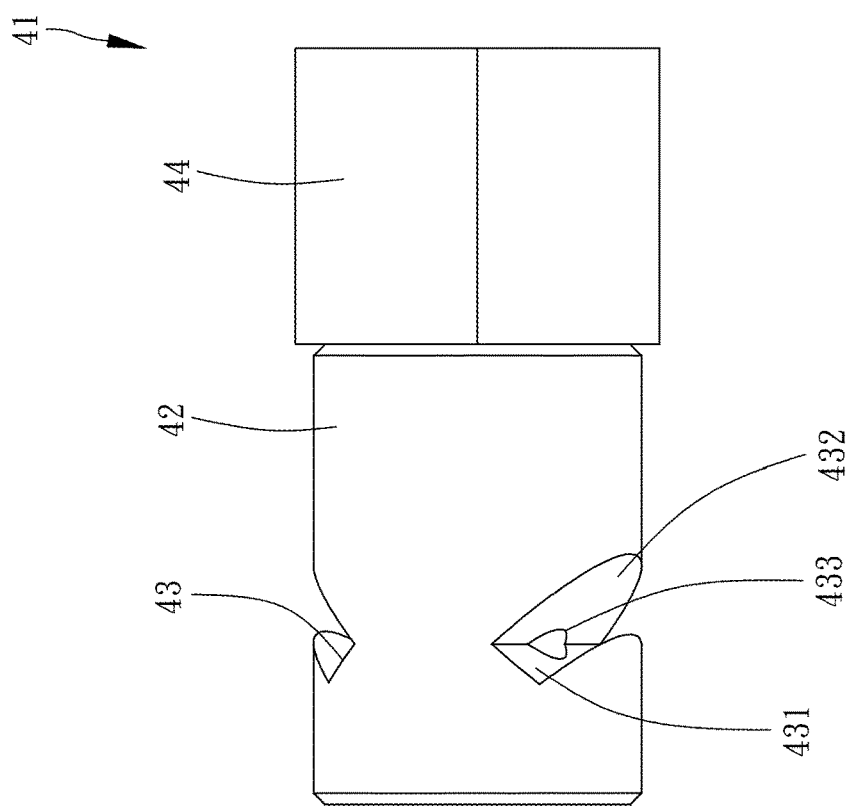
FIG. 8 is a side elevation of the nozzle connection assembly.

As shown in FIG. 3B specifically, after the tire has been inflated, a pull of the handle 15 can retract the external threads 911 into the forward sleeve 21 to return to the inoperative state.

Referring to FIGS. 4 to 9, a device 40 for inflating automobile tires in accordance with a second preferred embodiment of the invention is shown. The characteristics of the second preferred embodiment are detailed below.

The device 40 comprises a forward tube 21; an air intake assembly 31 including a joining member 32 having a first end secured to a second end of the forward tube 21 and using an O-ring 46 to seal a joining portion of the forward tube 21 and the internally threaded head, the joining member 32 having a constricted section 322 and an air inlet 321 at a second end; an air intake 34 extending out of the joining member 32 at an acute angle and having an air channel A adjacent to the constricted section 322 and communicating with the air inlet 321 through the constricted section 322, and a connector 341 at a distal end for releasably connecting to a pressurized air source 99; and a rear sleeve 33 having a first end secured to a second end of the joining member 32; a valve assembly 11 including a rod 12 through both the joining member 32 and the rear sleeve 33; a hollow mounting sleeve 13 projecting out of a first end of the rod 12 in the forward tube 21 and having a groove (not numbered) at a first end; a flexible tubular member (not numbered) 14 disposed in the mounting sleeve 13; a handle 15 secured to a second end of the rod 12; and a snap ring 16 snapped into an annular groove (not numbered) on the rod 12; a forward sleeve assembly 81 including a rear annular flange 84 on the forward tube 21, an intermediate sleeve 83 extending forward out of the flange 84 and put on the forward tube 21, and an internally threaded forward sleeve 82 secured to forward external threads (not numbered) of the intermediate sleeve 83; a nozzle connection assembly 41 in the forward sleeve 82 and including a rear enlargement 44, a forward tubular member 42 threadedly secured to the enlargement 44, two opposite grooves 43 on the tubular member 42, and an axial channel 45 through both the enlargement 44 and the tubular member 42; a limit ring 61 mounted on the tubular member 42; a compression spring 71 biased between the limit ring 61 and a shoulder between the enlargement 44 and the tubular member 42; and two rod-shaped catches 51 in the grooves 43 respectively and having two round ends 53 contacting the limit ring 61, and a shank 52.

An air path consists of the joining member 32, the rear sleeve 33 and the forward sleeve 21 and the air path communicates with the atmosphere through the air inlet 321 and the air channel A. A push of the handle 15 is required prior to inflating the tire. After the tire has been inflated, a pull of the handle 15 returns the device 40 to the inoperative state. The snap ring 16 may limit a rearward movement of the valve assembly 11 when the snap ring 16 is stopped by the constricted section 322.

While the invention has been described in terms of preferred embodiments, those skilled in the art will recognize that the invention can be practiced with modifications within the spirit and scope of the appended claims.

What is claimed is:

1. A device for inflating a tire including a valve having external threads, and an injection nozzle including a projection and a needle projecting rearward from the projection, comprising:

a forward sleeve including an internally threaded head at a first end, the internally threaded head being configured to threadedly secure to the external threads;

an air intake assembly including a joining member having a first end secured to a second end of the forward sleeve, the joining member having a constricted section and an air inlet at a second end; an air intake extending out of the joining member at an acute angle and having an air channel adjacent to the constricted section, the air channel being configured to be in fluid communication with the air inlet through the constricted section, and a connector; and a rear sleeve having a first end secured to a second end of the joining member; and a valve assembly including a rod through both the rear sleeve and the joining member; a mounting sleeve in a first end of the forward sleeve and having a groove at a first end, the groove being in the internally threaded head, and a fitting hole configured to be in fluid communication with the groove; a flexible tubular member disposed in the mounting sleeve and having a positioning section in the fitting hole; a handle secured to a second end of the rod; and a snap ring disposed on the rod;

wherein the projection is fastened by the groove and the needle is inserted into the positioning section;

wherein a push of the handle pushes the injection nozzle into the external threads; and wherein the snap ring is configured to limit a rearward movement of the valve assembly when the snap ring is stopped by the constricted section.

* * * * *